United States Patent Office 2,710,537
Patented June 14, 1955

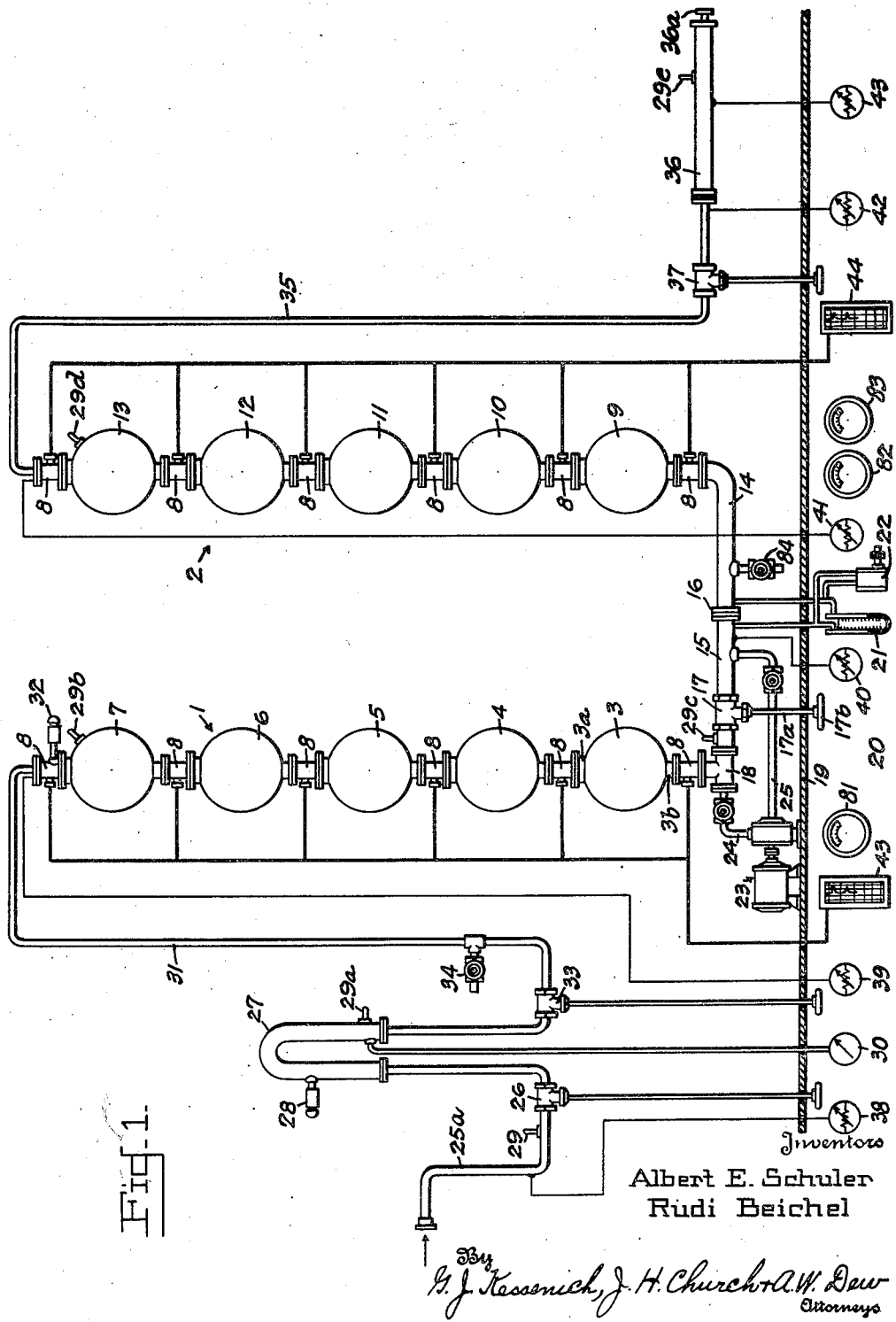

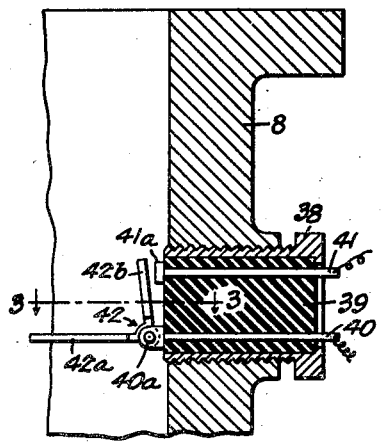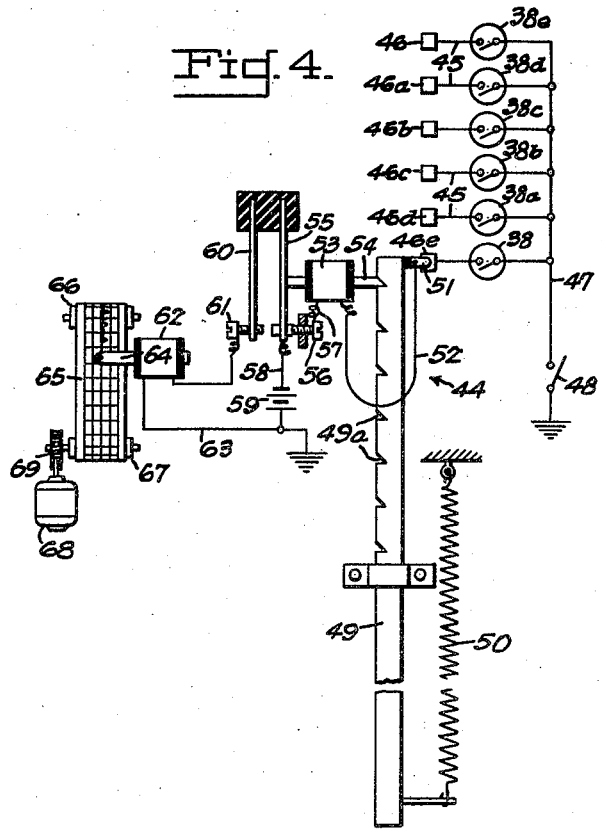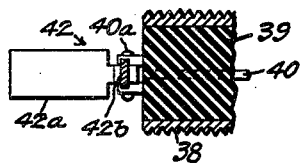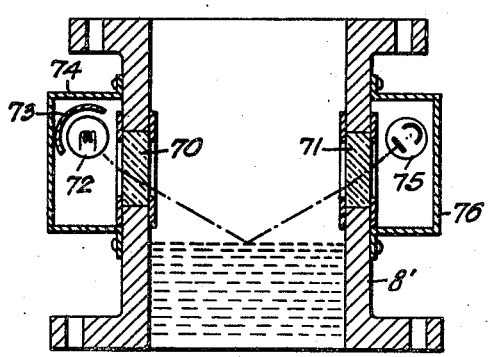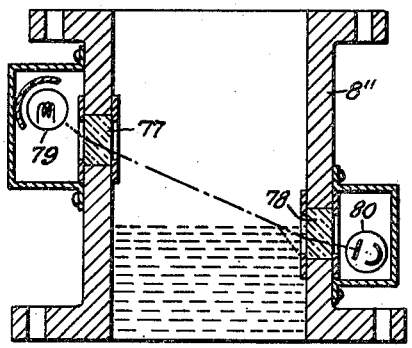

2,710,537

CALIBRATION STAND FOR FLOW METERS

Albert E. Schuler and Rudi Beichel, Huntsville, Ala., assignors to the United States of America as represented by the Secretary of the Army Application August 16, 1951, Serial No. 242,166

5 Claims. (Cl. 73—3)

(Granted under Title 35, U. S. Code (1952), sec. 266)

The invention described in the specification and claims may be manufactured and used by or for the Government for governmental purposes without the payment to us of any royalty thereon.

This invention relates to a mechanism or stand for calibrating gas flow meters, particularly such meters having high flow rate capacity. The accurate calibration of gas flow meters having capacity to handle high rates of flow, say of the order of 10,000 cubic feet per minute, is of especial importance in the rocket art because the development and accurate prediction of the performance of a rocket depends upon the accurate measurement of the rate at which the gases generated by the propellant therein, are discharged. On the other hand, the accurate measurements of such high rates of flow has heretofore been difficult because of the difficulty of means for accurately calibrating the meters used.

According to one prior art procedure, a gas supply of constant volume was provided. The temperature and pressure of the gas was determined before the test and again after the test. The changes in these values, combined with the measured duration of the test, was then used to determine the rate of flow. This procedure was difficult, unreliable and generally unsatisfactory because it required, either that the flow rate be substantially constant from the very start of the test and remain constant during the test, or that the quantity of gas consumed during the initial and final periods of the test when the rate of flow was changing, be very small compared to the amount of gas consumed during the actual test period at constant flow rate. Neither requirement can be satisfactorily met because in the first instance the calibration time was too short and the deleterious influence of the starting and stopping periods too high, while in the second instance the required constant volume of gas was too great for economical testing and calibration.

It has been suggested, in connection with the prior art method just described, to take continuous measurements of temperature and pressure as a function of time during the test period, in order to eliminate the errors otherwise introduced by the starting and stopping periods before and following the test period of constant flow rate. However, such procedure is not satisfactory because it requires an excessively large volume of gas in order to keep the gas expansion and temperature and pressure gradients at reasonable and readily measurable values. Otherwise, the high rates of change of pressure and temperature at the high flow rates involved, make it difficult or impractical to accurately determine their instantaneous values.

Furthermore, the use of a measuring tank and the displacement of the gas therefrom by water, does not eliminate the inaccuracies introduced by the starting and stopping periods, when the rates of flow are continuously changing.

Accordingly, it is the main object of the invention to provide a calibration mechanism and method wherein the inaccuracies and drawbacks of the prior art, as just described, are obviated.

Another object is to provide an apparatus for the calibration of flow meters wherein the influence of the starting and stopping periods is eliminated from the tests so that only constant flow rates are included in the test data.

Another object is to provide a calibration stand wherein flow rates are determined by the displacement of successive known volumes of gas at constant pressure and temperature and wherein the time required for the transfer or displacement of each known volume, is accurately determined.

More specifically, a still further object is to divide the total volume of gas to be utilized, into a plurality of interconnected smaller known increments or volumes and to accurately measure the elapsed time for each increment to be displaced by a liquid at constant temperature and pressure, by noting or automatically recording the transit of the liquid surface between increments.

Other objects and advantages will become obvious after a study of the following description.

In the drawing:

Figure 1 shows a diagrammatic lay-out of one form of the invention.

Figure 2 is a cross sectional detail view to an enlarged scale showing one form of circuit closer responsive to the rise or fall of a liquid surface therepast.

Figure 3 is a section on line 3—3 of Figure 2.

Figure 4 is a diagrammatic view of a recorder circuit and the means by which control thereof is transferred successively to the circuit closers.

Figure 5 is a cross section of a photoelectric cell type of circuit closer which may be substituted for the mechanical type of Figures 2 and 3, and Figure 6 is a modified form of photoelectric cell device which may be used in substitution for the form shown at Figure 5.

Referring in detail to the drawing, the numerals 1 and 2 identify generally first and second vertical columns of tanks or containers each column consisting of five generally spherical tanks. Thus the tanks or containers of column 1, which are identified by the numerals 3, 4, 5, 6 and 7 may each have a capacity of about 110 cubic feet. The tanks may be identical in construction and each is preferably of spherical form having diametrically opposite tubular connections, identified for tank 3 as 3a and 3b. In the model shown, these connections are flanged to facilitate connection with identical intermediate tubular couplings such as 8, whereby the tanks of a column are rigidly united in superposed communicating relation. Since all tanks are identical in the model shown, it will be sufficient to identify the tanks of column 2 by the numerals 9 through 13. The lower tanks 3 and 9 of the two columns, are interconnected by piping of large capacity which may include two of the coupling units 8 and interconnecting flanged pipe sections 14 and 15, an interposed orifice 16, a valve 17 and a T 18. The valve 17 is shown as having a control shaft 17a extending through partition 19 to the control room 20, where it is provided with a hand wheel 17b. A U-tube manometer 21 has its legs connected to opposite sides of the orifice in a manner well known in the art. If desired, a pressure transmitter 22 may also be connected in parallel with the manometer. An automatic pressure regulator 23 may be provided. As shown this consists of a motor-pump combination having a by-pass connection around valve 17, including valved inlet and outlet connections 24 and 25, respectively. When used, pressure regulator 23 may be under the control of pressure transmitter 22, to maintain constant the pressure drop across orifice 16. Since such mechanism is well known in the art, further description thereof is deemed unnecessary.

The uppermost tank 7 of column 1 is connected to a source of air, not shown, under constant pressure. Such connection is shown as a section of piping 25a having a valve 26 therein, and coupled to one leg of an equalizer 27 having a safety valve 28, and a pressure gage 30 within control room 20. A second section of piping 31 extends from the outlet of equalizer 27 to the coupling 8 at the top of tank 7. A safety valve 32 is provided in coupling 8. The connection 31 includes valves 33 and 34, the former being controllable from control room 20.

The top tank or container 13, of column 2 is connected by a pipe section 35, to a second equalizer 36 which has a connection 36a by which it may be coupled to a meter to be tested. Section 35 includes a valve 37, controllable in room 20. The purpose of the equalizers is simply to eliminate pulsations in flow.

Preferably, means are provided to indicate the pressure at critical points along the fluid paths; and for convenience and to enable readings to be taken at a single station within room 20, telemetric pressure indicators of a known type, are used. These include indicators 38 through 43, which respectively indicate the pressure within supply pipe section 25, at the entrance to tank 7, within pipe section 15, at the entrance to tank 13, within pipe section 35 immediately in advance of equalizer 36, and within equalizer 36.

Other refinements shown include temperature sensitive resistance elements 29, 29a, 29b, 29c, 29d and 29e, respectively positioned in pipe section 25, in equalizer 27, in container 7, between T 18 and valve 17, in container 13, and in equalizer 36. Although electrical connections have been omitted from Figure 1 in order to avoid a confusing amount of detail, elements 29 and 29a control temperature indicators at instrument 81. Likewise elements 29b and 29c control indicators at instrument 82, while elements 29d and 29e control indicators at instrument 83. By these instruments 81, 82 and 83, the temperature may be continuously indicated at six points spaced along the path of travel of the test fluids to make certain that the temperatures are equal at the start and finish of a test, and that they remain so during the test.

Means are provided to indicate and/or to record, with minimum delay, the passage of the liquid surfaces downwardly between the containers of column 1, and upwardly between the containers of column 2, as the liquid filling the containers of column is displaced downwardly by air under constant pressure flowing through pipe section 31 and, in turn, displaces the measuring gas filling the containers of column 2. Such means may conveniently be incorporated as a unit with the couplings 8, one of which is shown in detail in Figure 2. In this figure a portion of the wall of coupling 8 is shown as having a tubular metal plug 38 threaded therethrough. The plug has a core 39 of dielectric material secured therein in which two conductors 40 and 41 are sealed. The end of conductor 41 inside the fitting or coupling is formed as a simple electrical contact 41a. The corresponding end of conductor 40 is formed as a pivot support 40a (see Figure 3), for a baffle plate contact closer 42 consisting of an impact plate 42a and a functionally integral contact arm 42b. The parts are related so that when plate 42a is forced upwardly by the impact of the liquid as it surges upwardly in the containers comprising column 2, arm 42b is forced against contact 41a, to close the circuit of a recording mechanism hereinafter described. The plug 38 and all parts carried thereby is relatively small and compact and the plate 42a is dimensioned so that it can be inserted through the threaded hole in the wall of fitting 8.

In Figure 4 we have shown a mechanism by which the time of passage of the liquid level past each coupling or fitting 8, downwardly in column 1, and upwardly in column 2, may be automatically recorded. It is contemplated that two separate recorders will be used, one for column 1 and identified generally at 43, Figure 1, and another identified at 44, Figures 1 and 4. Recorder 44 will be described in detail wherein, referring to Figure 4, reference characters 38, 38a, etc., identify circuit-closing plugs as previously described in connection with Figures 2 and 3. From one terminal of each plug, a lead, such as 45, extends to a respective contact 46, 46a, etc. The other terminals of each plug are connected to a common lead 47 having a switch 48 therein.

A rod or slide 49 is guided on a base, not shown, for vertical translation and is urged upwardly by a spring 50. The upper end of the rod carries an insulated spring finger 51 adapted to make contact successively with contacts 46e etc., as the rod moves upwardly, step by step. Finger 51 is connected by a flexible lead 52, with one terminal of a solenoid 53 whose plunger 54 has an end shaped to engage within longitudinally-spaced notches 49a in rod 49 and, when so engaged, to positively prevent upward movement of the rod under the urge of spring 50. The notches are spaced the same as the contacts 46, 46a, etc., so that finger 51 comes to rest in engagement with a respective contact at the end of each step and thereby transfers control of the solenoid 53 to the elements 38, 38a, etc., in succession, as rod 49 rises.

The other end of plunger 54 engages a spring contact arm 55 which, in the normal position shown, engages a fixed contact screw 56 connected by a short lead 57 with the remaining terminal of solenoid 53. The arm 55 is connected by a lead 58 to one terminal of a battery 59, the other terminal of which is connected with an end of lead 47, previously mentioned.

A second spring contact arm 60 carries an adjustable contact screw 61 adapted to be engaged by the contact of arm 55 at the instant the latter breaks contact with screw 56. Screw 61 is connected with one terminal of a recorder solenoid 62 whose other terminal is connected by lead 63 with battery 59. The plunger 64 of solenoid 62 has a scriber at its end, adapted to contact a record sheet 65 passing over rollers 66 and 67 the latter of which is driven from constant speed motor 68 by reduction gearing 69. It will be understood that stops, not shown, are provided to limit the stroke of plunger 64 and also that the plunger is urged into engagement with one stop, by a spring, not shown, when solenoid 62 is deenergized. If desired or necessary, a spring may also be added to urge plunger 54 into engagement with slide 49. It is contemplated however, that the resiliency of the spring blade forming arm 55, will be sufficient for this purpose.

In Figure 5 we have shown an alternative form of coupling 8' using a light source and photoelectric cell. In this modification, the coupling has diametrically opposite windows 70 and 71 in its side walls. A source of light 72 and a reflector 73 are mounted adjacent window 70, as by means of a casing 74, while a photoelectric cell 75 is correspondingly mounted within a casing 76 opposite window 71. The parts are so positioned that no direct illumination of cell 75 by lamp 72 is possible. But when the liquid falls to, or passes a predetermined level in the couplings of column 1, or correspondingly rises in the couplings of column 2, the surface thereof reflects light from source 72 onto the cathode of cell 75 and momentarily energizes it. The cells may be inserted in a hook-up generally corresponding to Figure 4 but with a suitable amplifier interposed between the cells and solenoid 53 to supply the current necessary to operate the latter, in a manner well known in the art. In all cases, with the hook-up of Figure 4, circuit closers 38 or their equivalent, photo cells 75, when used in recorder 44 of column 2, will be connected in ascending order with the couplings 8. That is to say, referring to Figure 4, element 38 will be positioned in the lowermost coupling 8 of column 2, element 38a in the next higher coupling, and so on. On the other hand, when used to control recorder 43 of column 1, element 38 will be positioned in the uppermost coupling, element 38a in the next lower coupling, and so on.

In Figure 6 is shown a modified form of the photoelectric cell detector of Figure 5. In this modification, the coupling 8″ has windows 77 and 78 in its walls. These, while positioned in opposite walls, are spaced in an axial direction. A lamp 79 is located adjacent window 77 while a photoelectric cell 80 is located adjacent the other window. The arrangement is such that when no liquid is present in coupling 8″, light from source 79 is incident upon and energizes cell 80. However, when the liquid rises to a level substantially as indicated in Figure 6, the light rays from source 79 are refracted in a known manner so that they are no longer incident upon cell 80. The resulting de-energization of the cell is used to control a relay which in turn, will control the closure of the circuit through solenoid 53, Figure 4. This refers only to the couplings used in column 2. In column 1, as the liquid level drops, the cells 80 in couplings 8″ are successively energized and can be used in the same manner as described for the modification of Figure 5. In other words, no relays are necessary with the modification of Figure 6, when used between the containers of column 1.

In using the device, a meter to be calibrated is attached at 36a and water or other suitable liquid is admitted to fill the containers or tanks of column 1. Valve 17 will at this time be closed and valve 84 open, thus assuring that the containers of column 2 are filled with air. Valve 84 is then closed. A source of compressed air is connected with the free end of pipe section 25. The constant pressure value selected will depend upon the constant rate of flow at which calibration is to be effected. When the temperatures have equalized in columns 1 and 2, valves 26, 33 and 37 are opened. Next, valve 17 is opened and water is forced at a rapid rate from tank 7 and into container 9. As the liquid rises past the detector in fitting 8 at the bottom of tank 9, solenoid 53 of recorder 44 is energized in the manner previously disclosed and acts to move its plunger to the left thus freeing slide 49 and thereafter moving contact 55 out of engagement with contact 56 and into engagement with contact 61. Separation of contacts 55 and 56 de-energizes solenoid 53 while engagement of 55 with 61, energizes solenoid 62 and the resulting thrust on plunger 64 causes its scriber to make a distinct transverse mark on record sheet 65. The motion of the parts is so timed that plunger 54 is returned to engagement with slide 49 in time to pick up the next lower notch therein as spring 50 moves the slide upwardly. The upward step movement of the slide moves contact finger 51 onto contact 46d, and thus transfers further control of solenoid 53 to the circuit closer of element 38a. The cycle is then repeated in sequence as the water level rises past each of the couplings 8 and, with each cycle, a sharp, well-defined mark is made on record 65. Since the record sheet is being driven by motor 68 at a precisely-known rate, the time required for each container to be emptied of air can be very accurately determined. Concomitantly with the foregoing action, the water level is falling in column 1 and as it drops past each coupling 8, the recorder 43 is operated to make an identifiable mark and thus provide a record which acts as a check for the record made by instrument 44. The time required to expel air from container 9, when the rate of flow is increasing, and the time required to empty container 13 of air, when the rate is decreasing, are not used in the actual calibration. Since the rate of flow is constant by the time the liquid level passes the connection between containers 9 and 10 and is still constant at the instant the level passes from container 12 to container 13, the starting and stopping periods are without effect. It has been determined that for a flow rate of the order of 10,000 cfm., the flow can be computed with an accuracy of 0.35%. Pressure and temperature can be kept constant and measured within 0.25%. The overall calibration accuracy will therefore be better than 0.5%. The accuracy will increase with smaller flow rates. Pressure regulator 23 is used when required, to maintain the pressure of the fluid substantially constant during the test period.

The invention is also useful in determining the liquid flow rates through the containers of column 1, inasmuch as the instant the liquid level passes each of the couplings 8, is accurately recorded. The nozzle or orifice 16 can be used as a check on constancy of flow rate since any change is indicated by a corresponding change in the difference between levels in the manometer 21. Also, any such difference may be utilized by pressure transmitter 22, to control regulator 23, in a well-known manner.

Although the containers 3 through 7 and 9 through 13, are all shown as of equal capacity, this is not a necessity. The containers of column 1, for example, may be larger or smaller than those of column 2 and their number varied correspondingly so that the total capacities of the two columns are approximately equal.

Also the capacity of the tanks 3, 7, 9 and 13 which are involved during the starting and stopping periods may be decreased and the capacities of tanks 4, 5, 6, 10, 11 and 12, correspondingly increased. Such a modification would potentially increase the accuracy, assuming, of course, that constant flow rate has been established by the time the tank 7 is emptied of water and tank 9 is filled. Also it is possible to construct an apparatus according to the invention where the number of tanks in column 1 differs from the number in column 2, the total capacity of the two columns, of course, being approximately equal.

The invention can also be used to calibrate liquid flow meters by inserting the meter in the connecting line between the two container columns.

Therefore, the foregoing disclosure should be taken in an illustrative rather than a limiting sense; and it is our intention and desire to reserve all modifications falling within the scope of the subjoined claims.

Having now fully disclosed the invention what we claim and desire to secure by Letters Patent is:

1. In a device for calibrating gas flow meters, first and second container columns, each said column comprising a plurality of superposed closed tanks, each tank being of known volume, a tubular coupling connecting the bottom of one tank with the top of the next lower tank, a fluid connection between the bottoms of the lowermost tanks of said columns, first conduit means connecting the top tank of said first column with a supply of gas under constant pressure, second conduit means connecting the top tank of said second column with a meter to be tested, the volumes of said columns being substantially equal, means carried by each said coupling to produce a signal in response to the passage of a liquid surface therethrough, and means responsive to said signals recording the time intervals therebetween.

2. In a device for calibrating high-rate gas flow meters, a first column comprising a plurality of superposed closed liquid containers each of known volume, a coupling of reduced cross section connecting the bottom of each container with the top of the next lower container, a second column comprising a plurality of superposed closed liquid containers each of known volume, a coupling of reduced cross section connecting the bottom of each container of said second column with the top of the next lower container, a passageway connecting the bottoms of the lowermost containers of each column, a first conduit connected to the top of the uppermost container of said first column and adapted for connection with a source of gas under constant pressure, a second conduit connected with the top of the uppermost container of said second column and adapted for connection with a gas flow meter to be calibrated, signal means carried by each coupling to create a signal in response to the passage of the surface of a body of liquid therethrough, and recorder means responsive to said signal means and operable to record the time intervals between signals.

3. A device as recited in claim 2, there being a throttling orifice in said passageway, a manometer responsive to pressure difference across said orifice, a pressure regulator connected in said passageway, and means responsive to changes in pressure effective on said manometer to control said pressure regulator.

4. A device as recited in claim 2, said signal means comprising a plug removably mounted in the wall of each respective coupling, a pair of insulated contacts carried by said plug on the inner surface thereof, a conducting member pivoted on one said contact and adapted to engage the other said contact in response to passage of the surface of the body of liquid thereacross, said recorder means being electrically operated, and a circuit including said contacts and recorder means.

5. In a device for calibrating gas flow meters, first and second columns, each column comprising a plurality of superposed closed containers and connections of substantially the same volume each, connecting the top of each said container with the bottom of the next succeeding superposed container, a first conduit connecting the bottoms of the lowermost containers of said columns, a second conduit connecting the top container of said first column with a source of gas under pressure, a third conduit connecting the top container of said second column with a high-rate gas flow meter to be calibrated, and means responsive to the passage upwardly through each said passageway of said second column, of the surface of a body of liquid transferred thereto from said first column at substantially constant flow rate, for recording the times of said passages.

References Cited in the file of this patent
UNITED STATES PATENTS

| | | |
|---|---|---|
| 674,634 | Patton | May 21, 1901 |
| 1,574,460 | Williamson | Feb. 23, 1926 |
| 2,050,800 | Lane et al. | Aug. 11, 1936 |
| 2,330,845 | Samiran | Oct. 5, 1943 |
| 2,339,753 | Bloom | Jan. 25, 1944 |
| 2,352,312 | Donaldson | June 27, 1944 |
| 2,359,338 | Tyden | Oct. 3, 1944 |
| 2,490,627 | Hofberg | Dec. 6, 1949 |